US010685555B2

(12) United States Patent
Miyajima et al.

(10) Patent No.: US 10,685,555 B2
(45) Date of Patent: Jun. 16, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Yasushi Miyajima, Tokyo (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/738,160

(22) PCT Filed: May 19, 2016

(86) PCT No.: PCT/JP2016/064834
§ 371 (c)(1),
(2) Date: Dec. 20, 2017

(87) PCT Pub. No.: WO2017/026157
PCT Pub. Date: Feb. 16, 2017

(65) Prior Publication Data
US 2018/0182231 A1    Jun. 28, 2018

(30) Foreign Application Priority Data

Aug. 11, 2015  (JP) .................................. 2015-158706

(51) Int. Cl.
*H04W 4/33*  (2018.01)
*G08B 25/00*  (2006.01)
(Continued)

(52) U.S. Cl.
CPC .......... *G08B 25/008* (2013.01); *H04W 4/021* (2013.01); *H04W 4/029* (2018.02); *H04W 4/33* (2018.02); *G08B 21/22* (2013.01); *H04W 84/12* (2013.01)

(58) Field of Classification Search
CPC ........ G06Q 50/10; G08B 21/24; G08B 23/00; G08B 25/008; G08B 13/08; G08B 13/22;
(Continued)

(56) References Cited

U.S. PATENT DOCUMENTS

2007/0052518 A1* 3/2007 Nakamura ............. G08B 25/00
340/5.3
2007/0276540 A1* 11/2007 Okuda ................. G05D 1/0272
700/245
(Continued)

FOREIGN PATENT DOCUMENTS

JP  2007-208416 A  8/2007
JP  2009-93470 A  4/2009
(Continued)

OTHER PUBLICATIONS

International Search Report dated Aug. 9, 2016 in PCT/JP2016/064834 filed May 19, 2016.

*Primary Examiner* — Hai Phan
*Assistant Examiner* — Anthony D Afrifa-Kyei
(74) *Attorney, Agent, or Firm* — Xsensus LLP

(57) ABSTRACT

[Object] To automatically distinguish whether an occupant is at home or not and to control an operating state of a management system of a house more simply.
[Solution] An information processing apparatus according to the present disclosure includes: a radio wave information learning section configured to record a plurality of pieces of radio wave information detected in a house and learn radio wave information of a plurality of terminals supposed to be in the house on a basis of the recorded radio wave information; and a control section configured to compare newly detected radio wave information and the radio wave information of the plurality of terminals supposed to be in the house based on a result of the learning, and perform processing for changing an operating state of a system that
(Continued)

manages the house in a case where none of the plurality of terminals supposed to be in the house were detected for a prescribed time or more.

15 Claims, 10 Drawing Sheets

(51) Int. Cl.
  *H04W 4/029* (2018.01)
  *H04W 4/021* (2018.01)
  *G08B 21/22* (2006.01)
  *H04W 84/12* (2009.01)

(58) Field of Classification Search
  CPC ........ G08B 21/22; H04W 88/02; H04W 4/33; H04W 4/029; H04W 4/02; H04W 4/021; H04W 84/12; G08C 17/00; G08C 2201/20; G08C 2201/32; G08C 2201/71; G08C 2201/91
  See application file for complete search history.

(56) References Cited

U.S. PATENT DOCUMENTS

| | | | | |
|---|---|---|---|---|
| 2012/0019674 | A1* | 1/2012 | Ohnishi | G08C 17/00 348/207.1 |
| 2014/0062678 | A1* | 3/2014 | de Clercq | G05B 15/02 340/12.5 |
| 2016/0284186 | A1* | 9/2016 | Pavlich | H04W 24/04 |
| 2017/0018688 | A1* | 1/2017 | Mazed | H01L 33/502 |
| 2018/0211507 | A1* | 7/2018 | Ihara | G08B 13/1966 |

FOREIGN PATENT DOCUMENTS

| | | | | |
|---|---|---|---|---|
| JP | 2014-102546 A | | 6/2014 | |
| JP | 2014101546 A | * | 6/2014 | |
| JP | 2014102546 A | * | 6/2014 | |
| JP | 2014102546 A | * | 6/2014 | |
| JP | WO 2017026155 A1 | * | 2/2017 | ............ H04W 88/02 |
| WO | WO-2017026155 A1 | * | 2/2017 | ............ H04W 88/02 |

* cited by examiner

FIG. 5

HOME TERMINAL DB

| TERMINAL ID | RADIO WAVE INFORMATION | TERMINAL TO BE MONITORED | AUTHENTICATION INFORMATION | TIME STAMP AT TIME OF REGISTRATION | TIME STAMP AT TIME OF LAST DETECTION | OPERATING CONDITION | ⋯ |
|---|---|---|---|---|---|---|---|
| AAAA | DATA A | Y | DATA a | 2015.3.1 09:15:00 | 2015.5.2 11:00:00 | Y | ⋯ |
| BBBB | DATA B | Y | — | 2015.3.1 12:00:00 | 2015.5.2 11:00:00 | Y | ⋯ |
| CCCC | DATA C | N | — | 2015.4.1 13:00:00 | 2015.5.1 23:00:00 | N | ⋯ |
| DDDD | DATA D | N | — | 2015.4.1 14:05:00 | 2015.5.1 21:00:00 | N | ⋯ |
| ⋯ | ⋯ | ⋯ | ⋯ | ⋯ | ⋯ | ⋯ | ⋯ |

FIG. 6

HOME TERMINAL CANDIDATE DB

| TERMINAL ID | RADIO WAVE INFORMATION | TIME STAMP AT TIME OF FIRST DETECTION | TIME STAMP AT TIME OF LAST DETECTION | NUMBER OF TIMES OF DETECTION | ... |
|---|---|---|---|---|---|
| 1111 | DATA 1 | 2015.5.1 09:15:00 | 2015.5.2 12:00:00 | 10 | ... |
| 2222 | DATA 2 | 2015.5.1 12:00:00 | 2015.5.1 12:00:00 | 1 | ... |
| 3333 | DATA 3 | 2015.5.1 13:00:00 | 2015.5.1 13:00:00 | 1 | ... |
| 4444 | DATA 4 | 2015.5.1 14:05:00 | 2015.5.1 21:00:00 | 3 | ... |
| ..... | ..... | ..... | ..... | ..... | ... |

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

These days, home security systems are coming into wide use; in the home security system, burdens such as new equipment investment and installation work, for example the need to install a human sensor using infrared light or the like, are imposed. Hence, technologies to create a home security system simply are being developed.

For example, Patent Literature 1 below proposes a technology in which electrical devices having a function of wireless communication are used, and an electrical device having a function of wireless communication and existing in a house is registered in advance; and in a case where a home security system is in a warning standby mode and a response signal concerning wireless communication is emitted from an unregistered electrical device, the home security system is transitioned to a warning mode.

CITATION LIST

Patent Literature

Patent Literature 1: JP 2014-102546A

DISCLOSURE OF INVENTION

Technical Problem

In the technology proposed in Patent Literature 1 above, by using a radio wave signal used for the connection of a wireless LAN, a home security system can be created simply without installing a human sensor or the like. However, in the technology proposed in Patent Literature 1 above, when the power source of an electronic device that is the core of the home security system is turned off by the user's manipulation, whether to transition the home security system to the warning standby mode or not is chosen by the user. Further, in Patent Literature 1 above, although it is mentioned that the electronic device that is the core of the home security system is allowed to automatically distinguish whether an occupant is at home or not, there is no mention of a mechanism that automatically distinguishes whether an occupant is at home or not.

Hence, a technology that automatically distinguishes whether an occupant is at home or not and is capable of controlling the operating state of a management system of a house including a home security system more simply is strongly desired.

Thus, the present disclosure proposes an information processing apparatus, an information processing method, and a program that automatically distinguish whether an occupant is at home or not and are capable of controlling the operating state of a management system of a house more simply.

Solution to Problem

According to the present disclosure, there is provided an information processing apparatus including: a radio wave information learning section configured to record a plurality of pieces of radio wave information detected in a house and learn radio wave information of a plurality of terminals supposed to be in the house on a basis of the recorded radio wave information; and a control section configured to compare newly detected radio wave information and the radio wave information of the plurality of terminals supposed to be in the house based on a result of the learning, and perform processing for changing an operating state of a system that manages the house in a case where none of the plurality of terminals supposed to be in the house were detected for a prescribed time or more.

Further, according to the present disclosure, there is provided an information processing method including: recording a plurality of pieces of radio wave information detected in a house and learning radio wave information of a plurality of terminals supposed to be in the house on a basis of the recorded radio wave information; and comparing newly detected radio wave information and the radio wave information of the plurality of terminals supposed to be in the house based on a result of the learning, and performing processing for changing an operating state of a system that manages the house in a case where none of the plurality of terminals supposed to be in the house were detected for a prescribed time or more.

Further, according to the present disclosure, there is provided a program for causing a computer to execute the processing of: a radio wave information learning function of recording a plurality of pieces of radio wave information detected in a house and learning radio wave information of a plurality of terminals supposed to be in the house on a basis of the recorded radio wave information; and a control function of comparing newly detected radio wave information and the radio wave information of the plurality of terminals supposed to be in the house based on a result of the learning, and performing processing for changing an operating state of a system that manages the house in a case where none of the plurality of terminals supposed to be in the house were detected for a prescribed time or more.

Further, according to the present disclosure, a plurality of pieces of radio wave information detected in a house are recorded and radio wave information of a plurality of terminals supposed to be in the house is learned on a basis of the recorded radio wave information; and newly detected radio wave information and the radio wave information of the plurality of terminals supposed to be in the house based on a result of the learning are compared with each other, and processing for changing an operating state of a system that manages the house is performed in a case where none of the plurality of terminals supposed to be in the house were detected for a prescribed time or more.

Advantageous Effects of Invention

As described above, according to the present disclosure, it becomes possible to automatically distinguish whether an occupant is at home or not and control the operating state of a management system of a house more simply.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram showing an example of a data structure of a home terminal database in the information processing apparatus according to the embodiment.

FIG. 6 is an explanatory diagram showing an example of a data structure of a home terminal candidate database in the information processing apparatus according to the embodiment.

MODE(S) FOR CARRYING OUT THE INVENTION

Figure 1:
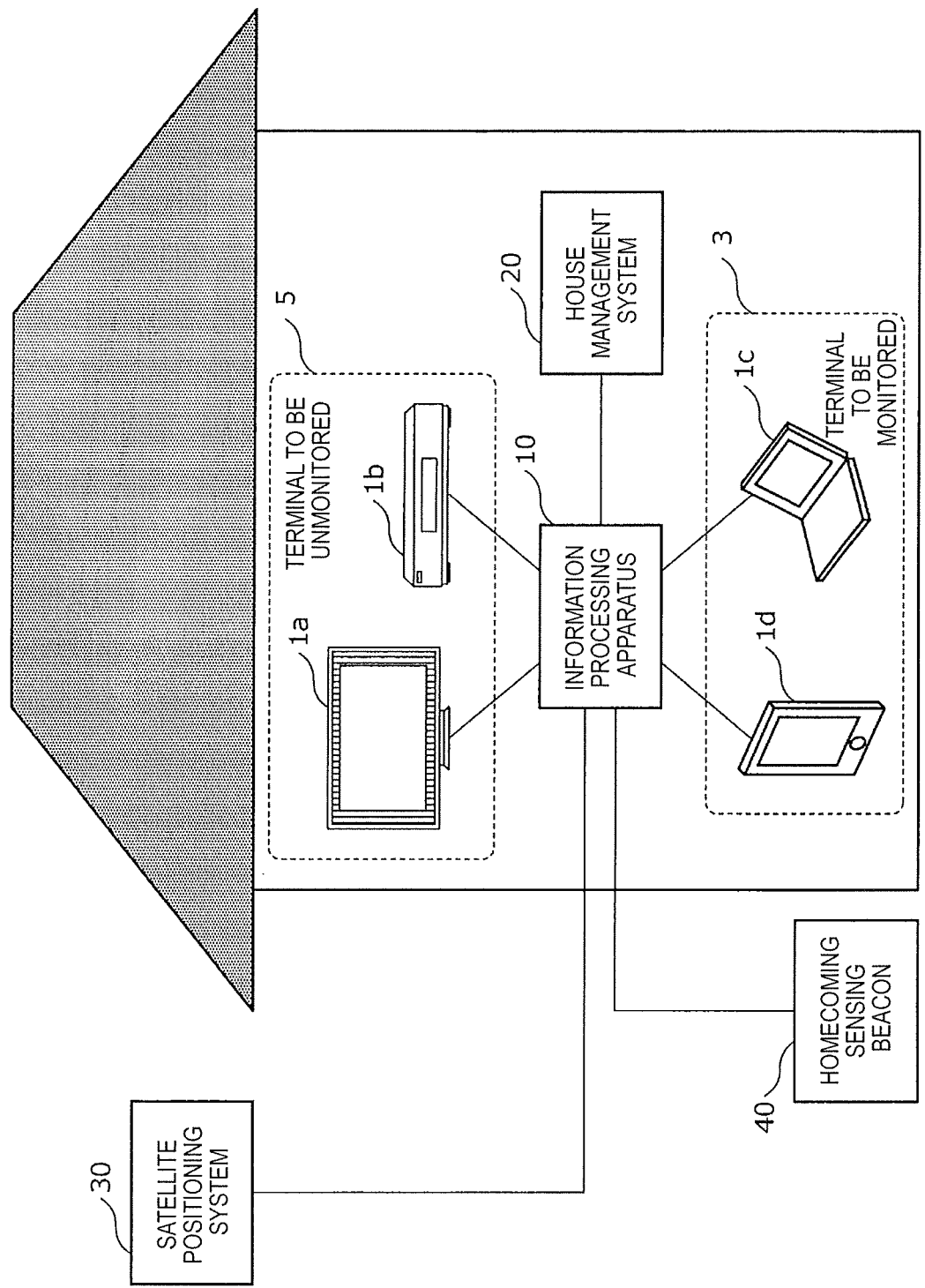
FIG. 1 is an explanatory diagram for describing an information processing apparatus according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. First Embodiment
1.1. With regard to information processing apparatus
1.1.1. With regard to relationships between information processing apparatus and other devices
1.1.2. With regard to configuration of information processing apparatus
1.2. With regard to information processing method
1.2.1. Flow of processing at time of transition to absence mode
1.2.2. Flow of processing at time of cancellation of absence mode
2. With regard to hardware configuration First Embodiment <With Regard to Information Processing Apparatus>
[With Regard to Relationships of Information Processing Apparatus with Other Devices]

Figure 2:
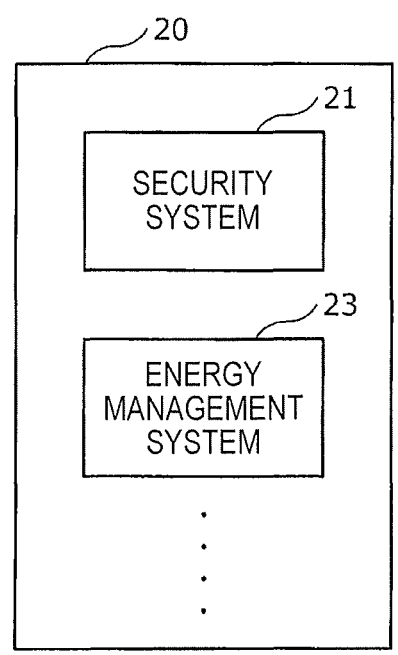
FIG. 2 is an explanatory diagram for describing a house management system according to the embodiment.

First, an information processing apparatus according to a first embodiment of the present disclosure is described in detail with reference to FIG. 1 and FIG. 2, centering on relationships with other devices. FIG. 1 is an explanatory diagram for describing an information processing apparatus according to the present embodiment, and FIG. 2 is an explanatory diagram for describing a house management system according to the present embodiment.

An information processing apparatus 10 according to the present embodiment is an apparatus that is provided in a house of a user, and automatically distinguishes whether an occupant is at home or not and controls the operating state of a house management system, in mutual cooperation with various house management systems 20 installed in the house, as necessary.

In the house of the user, there are various electrical appliances and devices that emit radio waves. In the present embodiment, various electrical appliances and electronic devices that emit various radio waves during operation are taken as home terminals, and the information processing apparatus 10 manages information regarding radio waves emitted from home terminals 1, as radio wave information. The home terminal 1 is not particularly limited as long as it is an electrical appliance or an electronic device that emits various radio waves during operation; and may be various AV devices such as a television 1a and a digital recorder 1b, various computers such as a notebook computer 1c, or portable communication terminals such as a smartphone 1d, a tablet terminal, and a wearable terminal. Further, as well as these devices, known electrical appliances such as a portable music player and a portable game machine may be given.

Here, the radio wave information acquired by the information processing apparatus 10 from various home terminals like the above includes various pieces of information regarding various radio waves observed by the information processing apparatus 10, or a radio wave monitor node or the like connected to the information processing apparatus 10 (for example, radio waves used for various types of wireless communication such as wireless LAN communication, for example Wi-Fi and Bluetooth (registered trademark)).

As described in detail below, the information processing apparatus 10 according to the present embodiment utilizes radio wave information obtained from various home terminals and distinguishes whether the occupant is at home or not. At the time of the distinction, the information processing apparatus 10 according to the present embodiment categorizes the home terminals into a terminal to be monitored 3 of which the emission state of the radio wave is to be monitored and a terminal to be unmonitored 5 that is not to be monitored, and then focuses attention on the emission state of the radio wave from the terminal to be monitored 3.

It is assumed that the terminal to be monitored 3 is, to the user living in the house, an electronic device or a communication device of which the power source is turned off whenever the user is away from the house, or an electronic device or a communication device that is carried whenever the user is away from the house. What electronic device or the like to take as the terminal to be monitored 3 may be decided on by the user living in the house, with the user's own lifestyle taken into consideration, as appropriate. In view of the way of life nowadays, a portable communication device such as a smartphone is a device that is presumed to be carried whenever it is away from the house, and hence such a portable communication device is preferably taken as the terminal to be monitored 3. In the following, a detailed description is given using as an example a case where a portable communication device is set as the terminal to be monitored 3.

The information processing apparatus 10 according to the present embodiment automatically distinguishes whether the occupant is absent or not on the basis of radio wave information obtained from the terminal to be monitored 3 among the home terminals 1 provided in the house, and controls the operating state of various house management systems 20 on the basis of the distinction result. Examples of such a house management system 20 include, as shown in FIG. 2, various security systems 21 that monitor a trespasser into the house, an energy management system 23 such as a smart grid or the like that manages the supply and use of electrical energy or the like in the house. As well as these systems, any system that manages the house of the user from a certain point of view may be taken as a house management system of which the operating state is managed by the information processing apparatus 10 according to the present embodiment. In the present embodiment, these house management systems 20 can mutually communicate with the information processing apparatus 10 via various networks such as the Internet and a LAN.

The information processing apparatus 10 may also acquire position information from a satellite positioning system 30 such as the global positioning system (GPS), as necessary. Further, the information processing apparatus 10 may operate in mutual cooperation with a homecoming sensing beacon 40 installed in the vicinity of the house (for example, near the entrance or the like).

Hereinabove, relationships between the information processing apparatus 10 according to the present embodiment and other devices are described in detail with reference to FIG. 1 and FIG. 2.

[With Regard to Configuration of Information Processing Apparatus]

Figure 3:
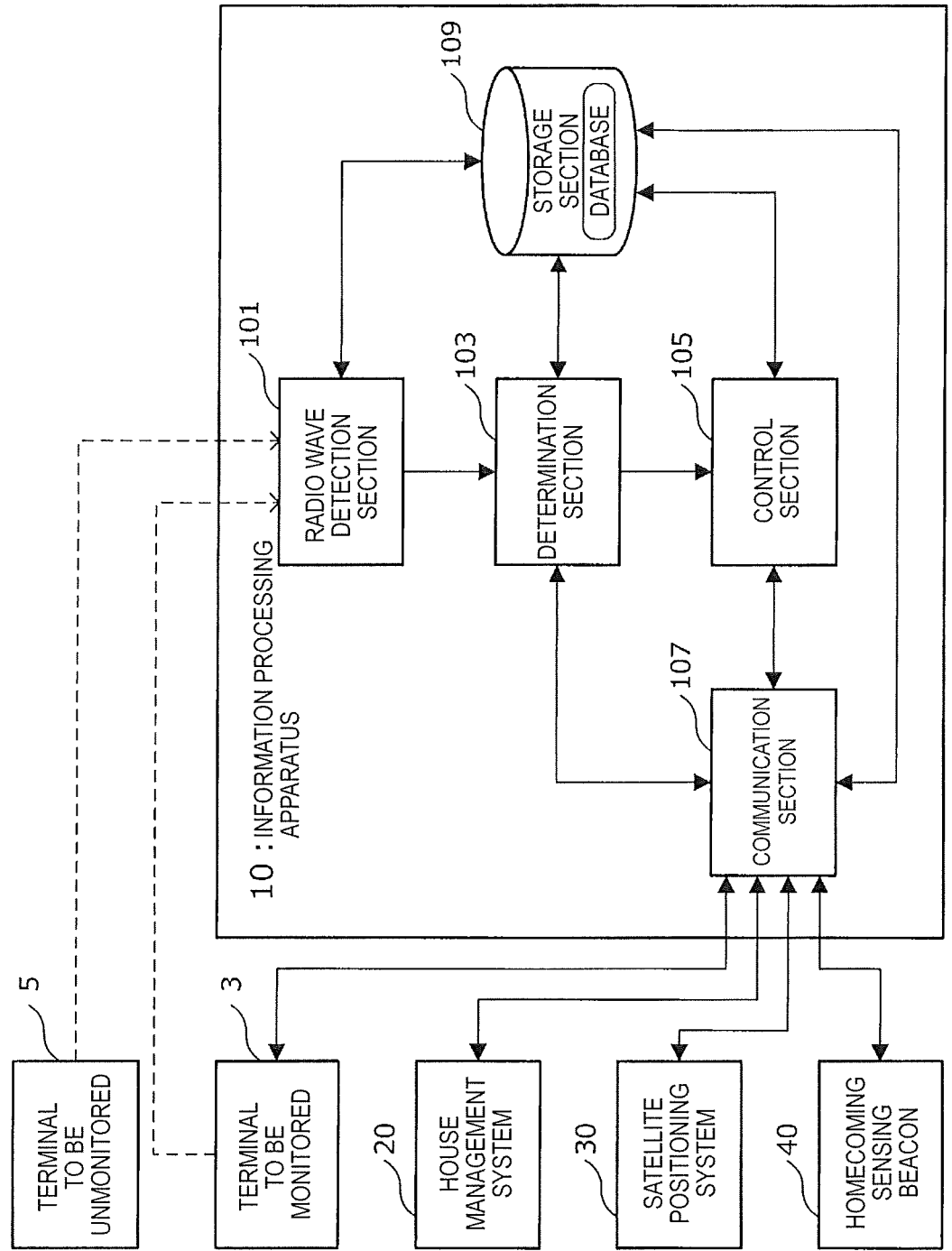
FIG. 3 is a block diagram showing an example of a configuration of the information processing apparatus according to the embodiment.
Figure 4:
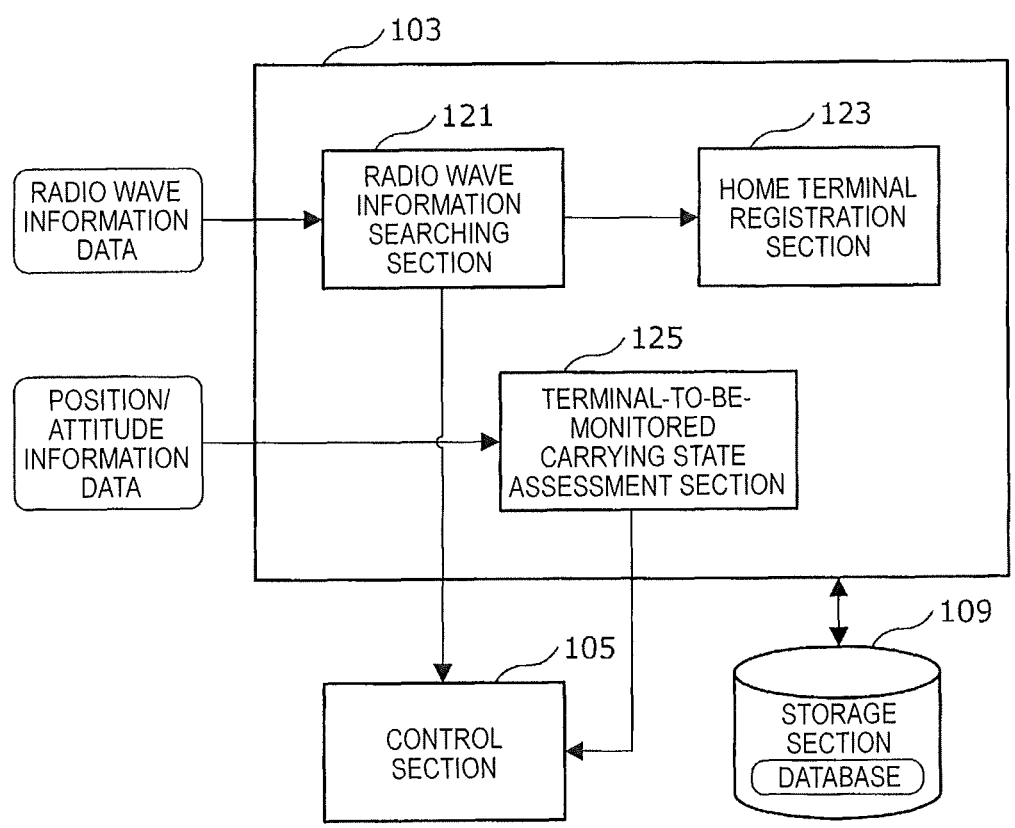
FIG. 4 is a block diagram showing an example of a configuration of a determination section included in the information processing apparatus according to the embodiment.
Figure 7:
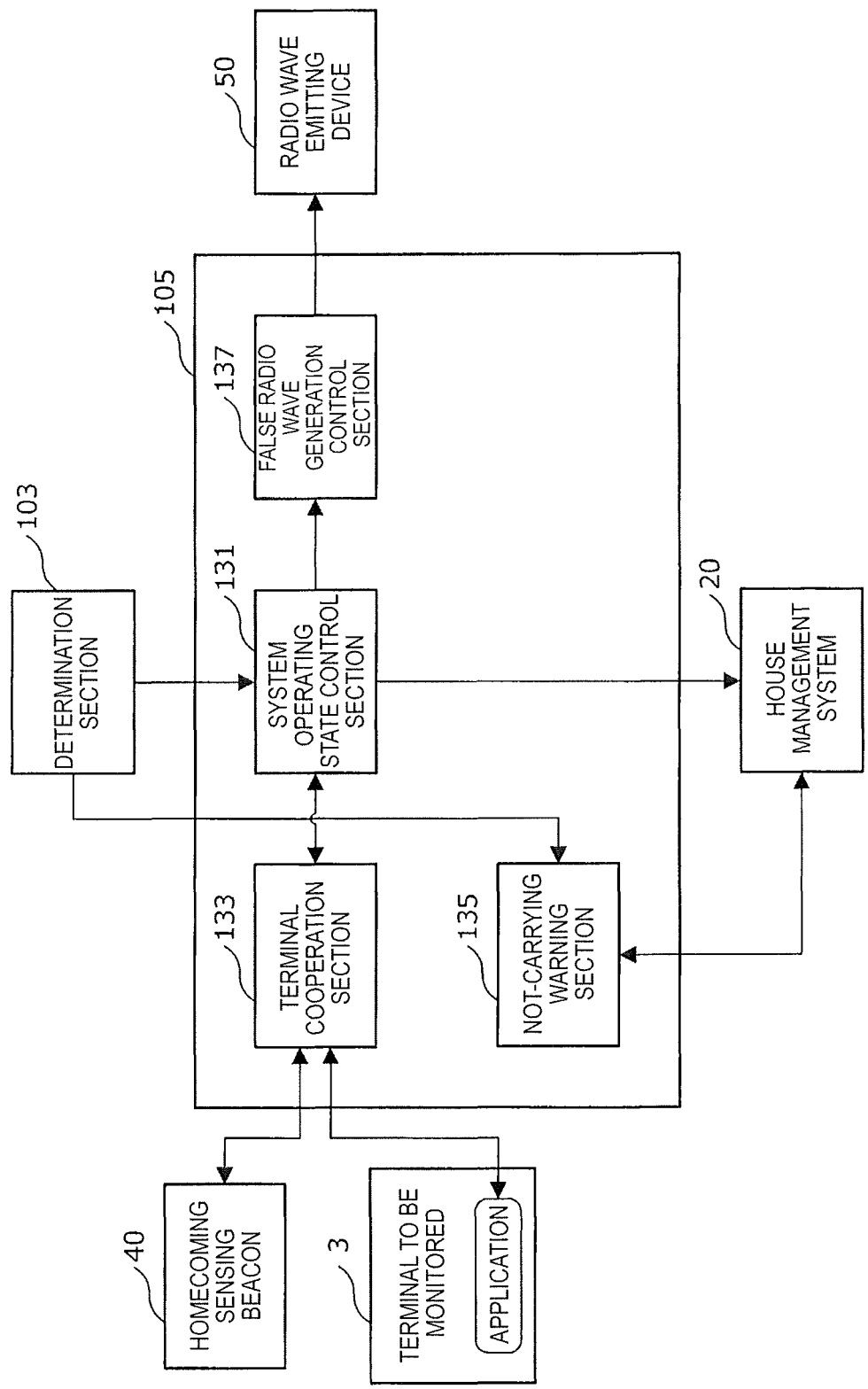
FIG. 7 is a block diagram showing an example of a configuration of a control section included in the information processing apparatus according to the embodiment.

Next, an example of a configuration of the information processing apparatus 10 having functions like the above is described in detail with reference to FIG. 3 to FIG. 7. FIG. 3 is a block diagram showing an example of a configuration of an information processing apparatus according to the present embodiment. FIG. 4 is a block diagram showing an example of a configuration of a determination section included in the information processing apparatus according to the present embodiment. FIG. 5 is an explanatory diagram showing an example of a data structure of a home terminal database in the information processing apparatus according to the present embodiment. FIG. 6 is an explanatory diagram showing an example of a data structure of a home terminal candidate database in the information processing apparatus according to an embodiment. FIG. 7 is a block diagram showing an example of a configuration of a control section included in the information processing apparatus according to the present embodiment.

The information processing apparatus 10 according to the present embodiment mainly includes, as shown in FIG. 3, a radio wave detection section 101, a determination section 103 that is an example of a radio wave information learning section, a control section 105, a communication section 107, and a storage section 109.

The radio wave detection section 101 is achieved with, for example, a central processing unit (CPU), a read only memory (ROM), a random access memory (RAM), a communication device, a radio wave sensor, etc. Further, the radio wave detection section 101 may be a device such as a radio wave monitor node incorporated in or connected to the information processing apparatus 10. The radio wave detection section 101 detects various radio waves emitted from the home terminals 1 (that is, the terminal to be monitored 3 and the terminal to be unmonitored 5), and generates radio wave information in which various feature values that feature the detected radio wave (for example, identification information, an electric field intensity, etc. proper to the radio wave) are written. On generating radio wave information like the above, the radio wave detection section 101 outputs the generated radio wave information to the determination section 103.

Further, it is preferable that the radio wave detection section 101 associate the radio wave information of the detected home terminal 1 with a time stamp and record these pieces of information as history information in the storage section 109 described later or the like.

The determination section 103 that is an example of a radio wave information learning section is achieved with, for example, a CPU, a ROM, a RAM, etc. The determination section 103 refers to a database that is related to radio wave information obtained from the home terminal 1 and that is created in the storage section 109 described later or the like in advance, and determines whether the radio wave information emitted from the home terminal 1 and outputted from the radio wave detection section 101 is radio wave information of the terminal to be monitored 3 or not. The timing at which such determination is performed is not particularly limited, and the determination may be performed each time radio wave information is outputted from the radio wave detection section 101 as needed, or may be performed at a prescribed time interval.

Here, in the database (DB) of the home terminal 1 created in the storage section 109 or the like in advance, radio wave information emitted from the corresponding home terminal 1 is recorded while the home terminal 1 registered in the information processing apparatus 10 is categorized into the terminal to be monitored 3 or the terminal to be unmonitored 5. Therefore, the determination section 103 can determine whether the radio wave information being focused on is radio wave information of the terminal to be monitored 3 or not by comparing the radio wave information outputted from the radio wave detection section 101 with each piece of radio wave information recorded in the database of the home terminal 1.

Note that it is assumed that, in the database of the home terminal 1, the categorization of whether the registered home terminal 1 is the terminal to be monitored 3 or not is set by the user in advance. For example, in a case where the user oneself manually registers the home terminal 1, whether to take the home terminal 1 on registration as the terminal to be monitored 3 or not may be set by a prescribed method at the time of the registration of the home terminal 1. Further, in a case where a new home terminal 1 is automatically detected by the information processing apparatus 10 and is automatically registered in the database, this fact may be notified to the user at the time point when the home terminal 1 is automatically registered, and whether to take the home terminal 1 as the terminal to be monitored 3 or not may be set by the user's manipulation after the registration.

If the determination section 103 determines whether the radio wave information outputted from the radio wave detection section 101 is radio wave information of the terminal to be monitored 3 or not on the basis of the database of the home terminal 1 recorded in the storage section 109 or the like, the determination section 103 outputs information regarding the obtained determination result to the control section 105 described later.

Further, as described in detail below, the determination section 103 can, using radio wave information, also automatically determine whether a new home terminal 1 exists in the house or not, and also determine whether the user is about to go out without carrying the terminal to be monitored 3 or not.

Note that a detailed configuration of the determination section 103 having such functions is described later.

The control section 105 is achieved with, for example, a CPU, a ROM, a RAM, etc. On the basis of the determination result obtained by the determination section 103, in a case where none of the pieces of radio wave information of the terminals to be monitored 3 were detected for a prescribed period, the control section 105 controls the operating state of the house management system 20.

Since the terminal to be monitored 3 is a home terminal 1 of which the power source is turned off whenever the user is away from the house or that is carried whenever the user goes out, a situation where none of the pieces of radio wave information of the terminals to be monitored 3 are detected for a prescribed period means that the user who is the occupant does not exist in the house. Thus, the control section 105 controls the operating state of the house management system 20; and puts into effect an operation at a higher security level of the security system 21 and transitions the security system 21 to an absence mode, and outputs a control signal for turning off the power source of a prescribed electronic device to the energy management system 23, for example.

In a case where radio wave information of any of the terminals to be monitored 3 is detected in a situation where the user does not exist in the house, this means that a radio wave from the terminal to be monitored 3 reaches the information processing apparatus 10, and therefore it is presumed that the user has returned near the house (or the user has come home). Thus, the control section 105 controls the operating state of the house management system 20; and transitions the security system 21 from the absence mode, which is an operation at a higher security level, to a normal mode, and outputs a control signal for turning on the power source of the prescribed electronic device to the energy management system 23, for example.

Further, on the basis of information from the determination section 103 or the house management system 20, the control section 105 can also warn the user who is about to leave the house that the user does not carry the terminal to be monitored 3. In the information processing apparatus 10 according to the present embodiment, during the period in which radio wave information emitted from the terminal to be monitored 3 is continuously acquired, it is determined that the user exists in the house, and the security system 21 is not transitioned to the absence mode, for example. Hence, in a case where, for example, the last user existing in the house goes out without carrying the terminal to be monitored 3 such as a smartphone, the information processing apparatus 10 determines, in spite of an absence state in which no user is in the house, that a user is at home. Thus, the control section 105 warns the user that the user does not carry the terminal to be monitored 3 on the basis of information from the determination section 103 or the house management system 20, and can thereby avoid a situation where there is no person in the house while the security system 21 does not transition to the absence mode.

Furthermore, in order to further improve the security of the house in the absence state, while the security system 21 is transitioned to the absence mode, the control section 105 may output a control signal that causes a false radio wave resembling a radio wave that the terminal to be monitored 3 emits to be emitted toward the outside, to a radio wave emitting device that emits a prescribed radio wave. Thereby, the situation can be made to look, to an ill-intentioned third party existing in the vicinity of the house, as if the user were at home, and the security of the house can be further improved. In such a case, since it is difficult to distinguish between the false radio wave and the radio wave that the terminal to be monitored 3 emits, it is important that the control section 105 manage the fact of emitting the false radio wave and not mistake the false radio wave for the radio wave that the terminal to be monitored 3 emits. In this case, it is preferable that the control section 105 seek the user's manual manipulation of cancellation from the absence mode, instead of radio wave information emitted from the terminal to be monitored 3, and transition the security system 21 from the absence mode to the normal mode in accordance with the cancellation manipulation.

Note that a detailed configuration of the control section 105 having such functions is described later.

The communication section 107 is achieved with, for example, a CPU, a ROM, a RAM, a communication device, etc. The communication section 107 controls communication performed between the information processing apparatus 10 and various devices and systems provided outside the information processing apparatus 10. The determination section 103 and the control section 105 of the information processing apparatus 10 can exchange various pieces of information with external devices and systems via the communication section 107. Specifically, the communication section 107 can mutually communicate with the home terminal 1 such as the terminal to be monitored 3 or the terminal to be unmonitored 5, the house management system 20, the satellite positioning system 30, the homecoming sensing beacon 40, etc. using a prescribed protocol, and can transmit and receive information.

Note that, although in FIG. 3 the communication section 107 having such functions and the radio wave detection section 101 are described as separate processing sections, the assignment of functions between the radio wave detection section 101 and the communication section 107 according to the present embodiment is not limited to such an example. That is, in the information processing apparatus 10 according to the present embodiment, it goes without saying that the radio wave detection section 101 may have the function of the communication section 107 and the communication section 107 does not necessarily exist, or the communication section 107 may have the function of the radio wave detection section 101 and the radio wave detection section 101 does not necessarily exist.

The storage section 109 is achieved with, for example, a RAM, a storage device, or the like included in the information processing apparatus 10 according to the present embodiment. In the storage section 109, various parameters, reports on processing still in progress, etc. that need to be saved when the information processing apparatus 10 according to the present embodiment performs some kind of processing, or various databases and programs, etc. are recorded, as appropriate.

For example, a database concerning radio wave information etc. of the home terminal 1 registered in the information processing apparatus 10, a database concerning radio wave information of a candidate for the home terminal 1 that is presumed to be newly installed in the house, etc. are stored in the storage section 109 in accordance with a prescribed data form.

The radio wave detection section 101, the determination section 103, the control section 105, the communication section 107, etc. can freely perform data read/write processing on the storage section 109 in which such various pieces of information are stored.

With Regard to Configuration of Determination Section 103

Next, the configuration of the determination section 103 included in the information processing apparatus 10 according to the present embodiment is described in detail with reference to FIG. 4 to FIG. 6.

As schematically shown in FIG. 4, the determination section 103 that achieves functions like the above includes at least a radio wave information searching section 121, and may further include a home terminal registration section 123 and a terminal-to-be-monitored carrying state assessment section 125.

The radio wave information searching section 121 is achieved with, for example, a CPU, a ROM, a RAM, etc. On the basis of radio wave information outputted from the radio wave detection section 101, the radio wave information searching section 121 searches a database (hereinafter, also simply referred to as "home terminal DB") concerning radio wave information of the home terminals 1 stored in the storage section 109 or the like.

An example of the data structure of the home terminal DB stored in the storage section 109 or the like is shown in FIG. 5. As schematically shown in FIG. 5, in the home terminal DB, radio wave information data (or information showing the storage place of radio wave information data) emitted from the home terminal 1 are recorded while being associated with identification information (ID information) proper to the home terminal 1 that has emitted the radio wave information. Further, in the home terminal DB, the categorization of whether the corresponding home terminal 1 is the terminal to be monitored 3 or not is associated with each piece of recorded radio wave information. Furthermore, a time stamp showing the time of being registered for the first time, a time stamp showing the time when the corresponding radio wave information was detected most recently, the operating condition of the home terminal 1 (whether it is in operation or not), etc. are associated with each piece of radio wave information.

Here, the registered radio wave information data may have any data configuration as long as a feature value that features an observed radio wave, such as ID information or an electric field intensity proper to the observed radio wave, is written. In the radio wave information, for example, identification information such as an MAC address that is information proper to an individual radio wave to be observed, the electric field intensity of a radio wave, etc. are written. Further, as well as these feature values, an arbitrary feature value that features an observed radio wave may be written. The data configuration of radio wave information data is not particularly limited, and may be an arbitrary data configuration.

The type of ID information recorded in the home terminal DB like the above and the method for writing ID information are not particularly limited, and an arbitrary known one may be used as appropriate. Further, the method for writing a time stamp is not particularly limited either, and a time stamp may be written using an arbitrary writing method, as appropriate.

Note that, in addition to various pieces of information like the above, various pieces of information related to a radio wave emitted from the home terminal 1 may be recorded in the home terminal DB. Further, in a case where the recorded home terminal 1 is set as the terminal to be monitored 3, another type of authentication information different from radio wave information may be further associated. The type of such authentication information is not particularly limited either, and any authentication information that can be used for mutual authentication between the terminal to be monitored 3 and the information processing apparatus 10 may be used. By further associating such authentication information with radio wave information, the information processing apparatus 10 can perform various pieces of processing (in particular, the processing of controlling the operating state of a house management system) using not only radio wave information but also authentication information; and the security of the information processing apparatus 10 can be further improved.

The radio wave information searching section 121 refers to the home terminal DB like that shown in FIG. 5, and determines whether radio wave information outputted from the radio wave detection section 101 has been registered in the home terminal DB or not. In a case where the radio wave information being focused on exists in the home terminal DB, the radio wave information searching section 121 determines whether the home terminal 1 associated with the extracted radio wave information is the terminal to be monitored 3 or not. If the determination result of whether the radio wave information being focused on is radio wave information from the terminal to be monitored 3 or not is obtained, the radio wave information searching section 121 outputs information regarding the determination result to the control section 105.

Further, there may be a case where reference to the home terminal DB like that shown in FIG. 5 leads the radio wave information searching section 121 to a conclusion that the corresponding radio wave information is not registered in the home terminal DB. Such a case is presumed to be because an electronic device or the like emitting the radio wave information being focused on is a device newly brought into the house (for example, a device newly purchased by the user, a device brought in by a friend of the user who visited the house, etc.). Such an electronic device or the like emitting radio wave information and not registered in the home terminal DB can be seen as a candidate for a new home terminal. Thus, the radio wave information searching section 121 refers to a database (hereinafter, also simply referred to as "home terminal candidate DB") like that shown in FIG. 6 concerning radio wave information from a device registered as a candidate for a home terminal, and determines whether the radio wave information being focused on is radio wave information from a candidate for a home terminal or not.

An example of the data structure of the home terminal candidate DB stored in the storage section 109 or the like is shown in FIG. 6. As schematically shown in FIG. 6, in the home terminal candidate DB, radio wave information data (or information showing the storage place of the radio wave information data) emitted from an electronic device, a communication device, or the like existing in the house and not registered as the home terminal 1 are recorded while being associated with identification information (ID information) proper to the device that has emitted the radio wave information. Further, a time stamp showing the time when the corresponding radio wave information was detected for the first time, a time stamp showing the time when it was detected most recently, etc. are associated with each piece of radio wave information, and also information showing the number of times of detection or the like is associated. Note that, in addition to various pieces of information like the above, various pieces of information related to a radio wave emitted from an electronic device, a communication device, or the like existing in the house and not registered as the home terminal 1 may be recorded in the home terminal candidate DB.

The radio wave information searching section 121 refers to the home terminal candidate DB like that shown in FIG. 6, and determines whether the radio wave information being focused on exists or not. In a case where the radio wave information being focused on has already been recorded in the home terminal candidate DB, the item of "Time stamp at time of last detection" and the item of "Number of times of detection" are updated with the newest information in the home terminal candidate DB shown in FIG. 6. Further, in a case where the radio wave information being focused on is not recorded in the home terminal candidate DB, the radio wave information being focused on is newly registered in the home terminal candidate DB. After that, the radio wave information searching section 121 outputs information showing the updating of the home terminal candidate DB to the home terminal registration section 123 described below.

The home terminal registration section 123 is achieved with, for example, a CPU, a ROM, a RAM, etc. In a case where radio wave information recorded in the home terminal candidate DB like that shown in FIG. 6 was detected a prescribed number of times or more within a prescribed period, the home terminal registration section 123 registers the corresponding candidate for a home terminal in the home terminal DB like that shown in FIG. 5 as being a home terminal 1 newly installed in the house. In this event, the home terminal registration section 123 may notify the user that a home terminal is newly registered, and may seek the determination of whether to take the newly registered home terminal 1 as the terminal to be monitored 3 or not.

Further, in a case where radio wave information recorded in the home terminal candidate DB like that shown in FIG. 6 was not detected a prescribed number of times or more within a prescribed period, the home terminal registration section 123 determines that the corresponding electronic device or communication device existed in the house only temporarily, and deletes the record concerning the corresponding radio wave information from the home terminal candidate DB.

By the home terminal registration section 123 achieving functions like the above in cooperation with the radio wave information searching section 121, an electronic device or a communication device existing in the house is automatically registered as the home terminal 1.

The terminal-to-be-monitored carrying state assessment section 125 is achieved with, for example, a CPU, a ROM, a RAM, etc. The terminal-to-be-monitored carrying state assessment section 125 acquires, via the communication section 107 or the like, at least one of position information of the terminal to be monitored 3 outputted from the terminal to be monitored 3 and attitude information of the terminal to be monitored 3 outputted from the terminal to be monitored 3. After that, when it is determined that the existing position of the terminal to be monitored 3 specified from at least one of the position information and the attitude information is not changed (for example, when the terminal to be monitored 3 exists in an area of a prescribed radius or less with a certain position as the center, or like occasions), the terminal-to-be-monitored carrying state assessment section 125 determines that the user does not carry the terminal to be monitored 3.

Here, examples of the position information of the terminal to be monitored 3 outputted from the terminal to be monitored 3 include position information generated by the terminal to be monitored 3 cooperating with the satellite positioning system 30 or the like, position information generated in cooperation with a communication base station or the like, and the like. Further, examples of the attitude information of the terminal to be monitored 3 include attitude information outputted from various sensors such as a gravity sensor and an acceleration sensor incorporated in the terminal to be monitored 3 such as a mobile phone, a smartphone, or a tablet terminal, and the like.

If the terminal-to-be-monitored carrying state assessment section 125 determines whether the terminal to be monitored 3 registered in the home terminal DB and existing in the house is carried by the user or not in accordance with a method like the above, the terminal-to-be-monitored carrying state assessment section 125 outputs information regarding the obtained determination result to the control section 105. In a case where the user is about to go out without carrying the last terminal to be monitored 3 existing in the house, the control section 105 can, using the determination result, issue to the user a warning that the user does not carry the terminal to be monitored 3.

Hereinabove, the configuration of the determination section 103 included in the information processing apparatus 10 according to the present embodiment is described in detail with reference to FIG. 4 to FIG. 6.

With Regard to Configuration of Control Section 105

Next, the configuration of the control section 105 included in the information processing apparatus 10 according to the present embodiment is described in detail with reference to FIG. 7.

As schematically shown in FIG. 7, the control section 105 according to the present embodiment includes at least a system operating state control section 131 and a terminal cooperation section 133, and may further include a not-carrying warning section 135 and a false radio wave generation control section 137.

The system operating state control section 131 is achieved with, for example, a CPU, a ROM, a RAM, etc. The system operating state control section 131 controls the operating state of the house management system 20 installed in the house on the basis of information that is outputted from the determination section 103 and that shows the detection situation of radio wave information from the terminal to be monitored 3.

More specifically, on the basis of information outputted from the determination section 103, in a case where none of the pieces of radio wave information of the terminals to be monitored 3 were detected for a prescribed period, the system operating state control section 131 switches the security system 21 among the house management systems 20 to the operating state, and makes transition to the absence mode. Further, on the basis of information outputted from the determination section 103, in a case where none of the pieces of radio wave information of the terminals to be monitored 3 were detected for a prescribed period, the system operating state control section 131 may output a control signal for turning off the power source of a prescribed electronic device to the energy management system 23 among the house management systems 20.

Here, the length of the prescribed period mentioned above for controlling the operating state of the house management system 20 (in other words, the set time of an "absence sensing timer") is not particularly limited, and may be set by the user, with the user's way of life taken into consideration, as appropriate. Further, in a case where such a prescribed period is not set in advance, it is preferable that the system operating state control section 131 do not control the operating state of the house management system 20, in order to prevent a situation where the house management system 20 (in particular, the security system 21) operates while the user is not conscious.

Further, the system operating state control section 131 can easily determine whether none of the pieces of radio wave information of the terminals to be monitored 3 were detected for a prescribed period or not by referring to the record of the home terminal DB stored in the storage section 109 or the like.

In a case where the security system 21 is in the operating state (the absence mode) and it is determined from the determination section 103 that the existing position of the terminal to be monitored 3 included in newly acquired radio wave information of the terminal to be monitored 3 is in a prescribed range from the house, the system operating state control section 131 switches the security system 21 to the non-operating state. That is, in a case where radio wave information of the terminal to be monitored 3 has been newly acquired in a state where the security system 21 is in the absence mode, it is presumed that the user has come home (or will come home in a short time); hence, the system operating state control section 131 transitions the security system 21 from the absence mode to the normal mode.

Further, in a case where none of the pieces of radio wave information of the terminals to be monitored 3 were detected for a prescribed period and then it is determined that the existing position of the terminal to be monitored 3 included in newly acquired radio wave information of the terminal to be monitored 3 is in a prescribed range from the house, the system operating state control section 131 may output a control signal for turning on the power source of a prescribed electronic device to the energy management system 23.

Note that the system operating state control section 131 can control the operating state of not only the security system 21 or the energy management system 23 like the above but also various house management systems 20 of which the operating state is preferably changed in accordance with whether the user is at home or not.

Here, in a case where, in controlling the operating state of the house management system 20, the control of the operating state of the security system 21 (more specifically, control at the time of transition from the absence mode to the normal mode) cannot be performed appropriately, a situation where the user cannot enter the house although the user is located in front of the entrance of the house may occur. Hence, the system operating state control section 131 preferably performs the operating control of the security system 21 in mutual cooperation with the terminal cooperation section 133 described later so that the user can enter the house smoothly.

Further, as described above, in order to further improve the security of the house in the absence state, the system operating state control section 131 may, on transitioning the security system 21 to the absence mode, notify the false radio wave generation control section 137 described later that the system operating state control section 131 has transitioned the security system 21 to the absence mode.

The terminal cooperation section 133 is achieved with, for example, a CPU, a ROM, a RAM, etc. The terminal cooperation section 133 is a processing section that makes cooperation with the terminal to be monitored 3 in cooperation with the communication section 107 and the system operating state control section 131 so that smooth transmission and reception of radio wave information in conformity with the user's convenience are possible between the terminal to be monitored 3 and the information processing apparatus 10.

As mentioned above, it is in a situation where the user who had been away from the house has come home that smooth cooperation between the terminal to be monitored 3 and the information processing apparatus 10 is important. In this event, in a case where, for example, a radio wave such as a probe signal of a wireless LAN is emitted from the terminal to be monitored 3 with a good timing, the information processing apparatus 10 in the house can change the operating state of the security system 21 by receiving the probe signal. However, such a signal is emitted irregularly; therefore, a case where a radio wave is not sensed in the information processing apparatus 10 although the user has come home may occur. Thus, if the terminal cooperation section 133 receives from the system operating state control section 131 a notification that the security system 21 has entered the operating state and transitioned to the absence mode, the terminal cooperation section 133 transmits a push notification to the terminal to be monitored 3 carried by the user. The terminal to be monitored 3 that has received the push notification performs, for the user, display or the like that urges the startup of an application for cooperation with the information processing apparatus 10, and causes the user to start up the corresponding application.

If the application is started up, the application periodically transmits a radio wave to be sensed to the information processing apparatus 10 in cooperation with a satellite positioning system such as the GPS. More specifically, the application determines whether the terminal to be monitored 3 is in a prescribed range with the house as the center or not. In a case where the terminal to be monitored 3 is located in a prescribed range, the application makes the interval of radio wave emission shorter with proximity to the house in cooperation with the satellite positioning system, and causes a prescribed radio wave to be detected in the information processing apparatus 10 at the same time as the user's homecoming. Further, the application may simply use only position information of the satellite positioning system; and when the terminal to be monitored 3 is located in a prescribed range (for example, a range of a radius of several tens of meters or less) with the house as the center, the application may cause a prescribed radio wave to be emitted so that the prescribed radio wave is detected in the information processing apparatus 10.

Note that, although the above description mentions a case where the application finds the position of the terminal to be monitored 3 using a satellite positioning system such as the GPS, the application may use, instead of a satellite positioning system, the homecoming sensing beacon 40 installed in the vicinity of the entrance of the house or the like. In this case, when the terminal to be monitored 3 is located in the vicinity of the homecoming sensing beacon 40, the terminal to be monitored 3 may emit a prescribed radio wave for itself so that the prescribed radio wave is detected in the information processing apparatus 10.

By the terminal cooperation section 133 cooperating with the terminal to be monitored 3 by a mechanism like the above, the application being executed in the terminal to be monitored 3 can emit a radio wave toward the information processing apparatus 10 at an appropriate timing.

Further, the application may transmit authentication information registered in advance together with the radio wave information mentioned above. The terminal cooperation section 133 acquires authentication information transmitted from the application of the terminal to be monitored 3 via the communication section 107, and then refers to the home terminal DB stored in the storage section 109 or the like and performs the authentication processing of the acquired authentication information. If the authentication processing of authentication information is finished, the terminal cooperation section 133 notifies information showing the authentication result to the system operating state control section 131. In the system operating state control section 131, the cancellation processing of the security system 21 (the processing of transition to the normal mode) can be determined from two points of view by using not only the determination result of radio wave information outputted from the determination section 103 but also the authentication result of authentication information outputted from the terminal cooperation section 133. As a result, a trespass into the house by spoofing of a radio wave (for example, using assessment with the MAC address or the like) by an ill-intentioned third party can be prevented.

The not-carrying warning section 135 is achieved with, for example, a CPU, a ROM, a RAM, etc. In a case where the number of terminals to be monitored 3 existing in the house is only one and the user is about to leave the house without carrying the terminal to be monitored 3, the not-carrying warning section 135 warns the user that the user does not carry the terminal to be monitored 3. The type of such a warning is not particularly limited, and may be, for example, a warning of outputting a prescribed warning sound from the information processing apparatus 10 or the house management system 20. Such warning processing regarding the not-carrying of the terminal to be monitored 3 is performed on the basis of an assessment result concerning the carrying state of the terminal to be monitored 3 outputted from the determination section 103 and a notification from the house management system 20 (in particular, the security system 21). For example, the not-carrying warning section 135 refers to the home terminal DB stored in the storage section 109 or the like and determines whether the number of terminals to be monitored 3 existing in the house is only one or not. In a case where the number of terminals to be monitored 3 is only one, on the occasion when the assessment result from the determination section 103 is an assessment result showing that the user does not carry the terminal to be monitored 3, and a notification that, for example, the doorway of the entrance of the house or the like is opened is received from the security system 21, the not-carrying warning section 135 issues a warning to the user. By performing such warning processing, a situation where the user goes out without carrying the terminal to be monitored 3 can be prevented.

The false radio wave generation control section 137 is achieved with, for example, a CPU, a ROM, a RAM, etc. If the false radio wave generation control section 137 receives from the system operating state control section 131 a notification that the security system 21 is transitioned to the absence mode, the false radio wave generation control section 137 outputs a control signal for causing a false radio wave resembling a radio wave that the registered terminal to be monitored 3 emits to be emitted toward the outside, to a radio wave emitting device 50 that is, for example, provided outside the information processing apparatus 10 and is capable of emitting a prescribed radio wave. Thereby, a false radio wave resembling a radio wave emitted from the original terminal to be monitored 3 is emitted from the radio wave emitting device 50 toward the outside, and hence the situation can be made to look as if the user were at home. As a result, even if an ill-intentioned third party exists around the house, a trespass of the third party into the house can be prevented, and the security of the house can be ensured.

Hereinabove, the configuration of the control section 105 included in the information processing apparatus 10 according to the present embodiment is described in detail with reference to FIG. 7.

The above thus illustrates an example of the functions of the information processing apparatus 10 according to the present embodiment. Each of the above structural elements may be realized using general-purpose members or circuits, but may also be realized in hardware specialized in the function of each structural element. Additionally, the functions of each of the structural elements may also be conducted entirely by a CPU or the like. Consequently, it is possible to appropriately modify the configuration to be used according to the technological level at the time of carrying out the present embodiment.

Note that it is also possible to develop a computer program for realizing the respective functions of an information processing apparatus according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium.

<With Regard to Information Processing Method>

Figure 8:
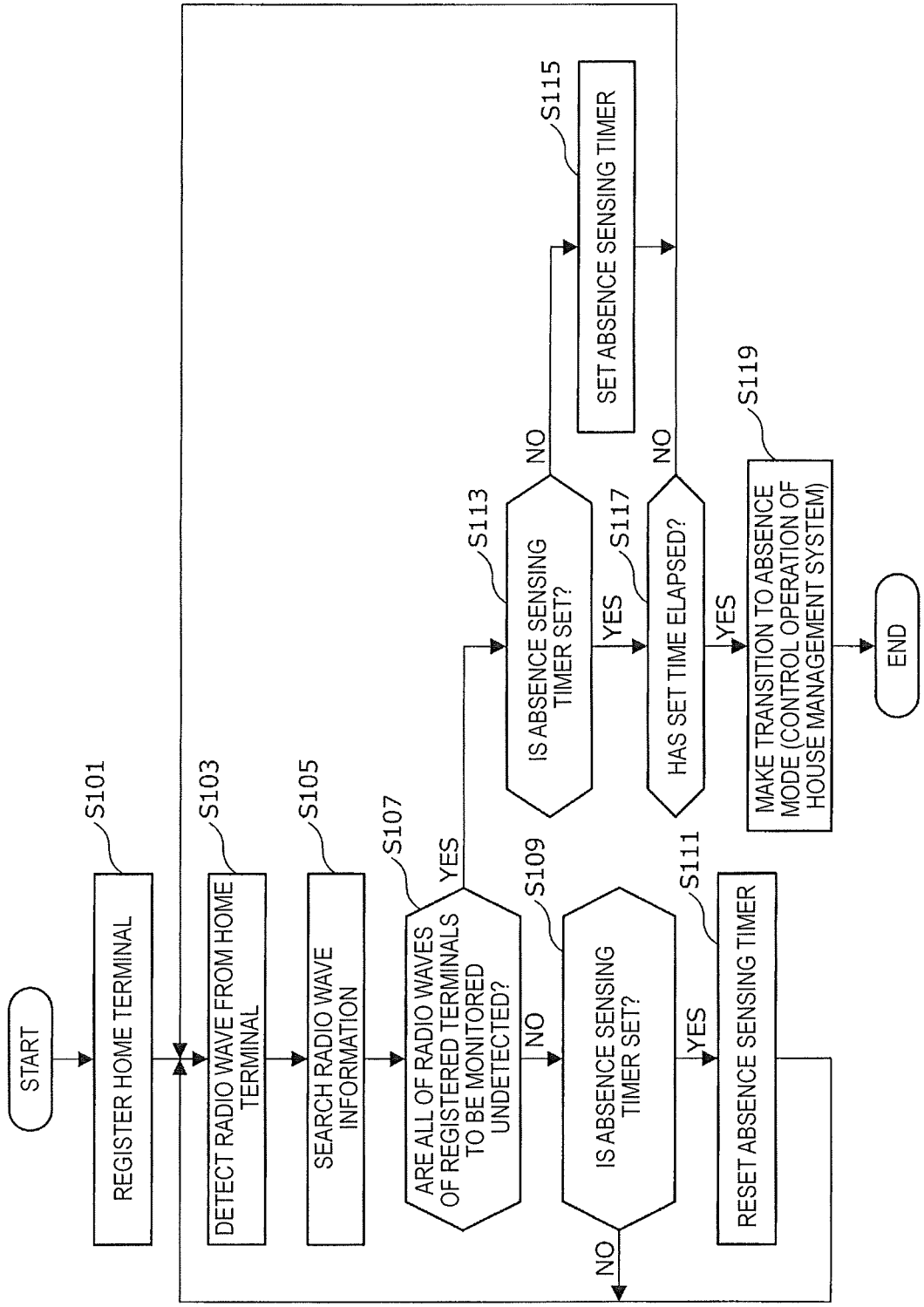
FIG. 8 is a flow chart showing an example of a flow of an information processing method according to the embodiment.
Figure 9:
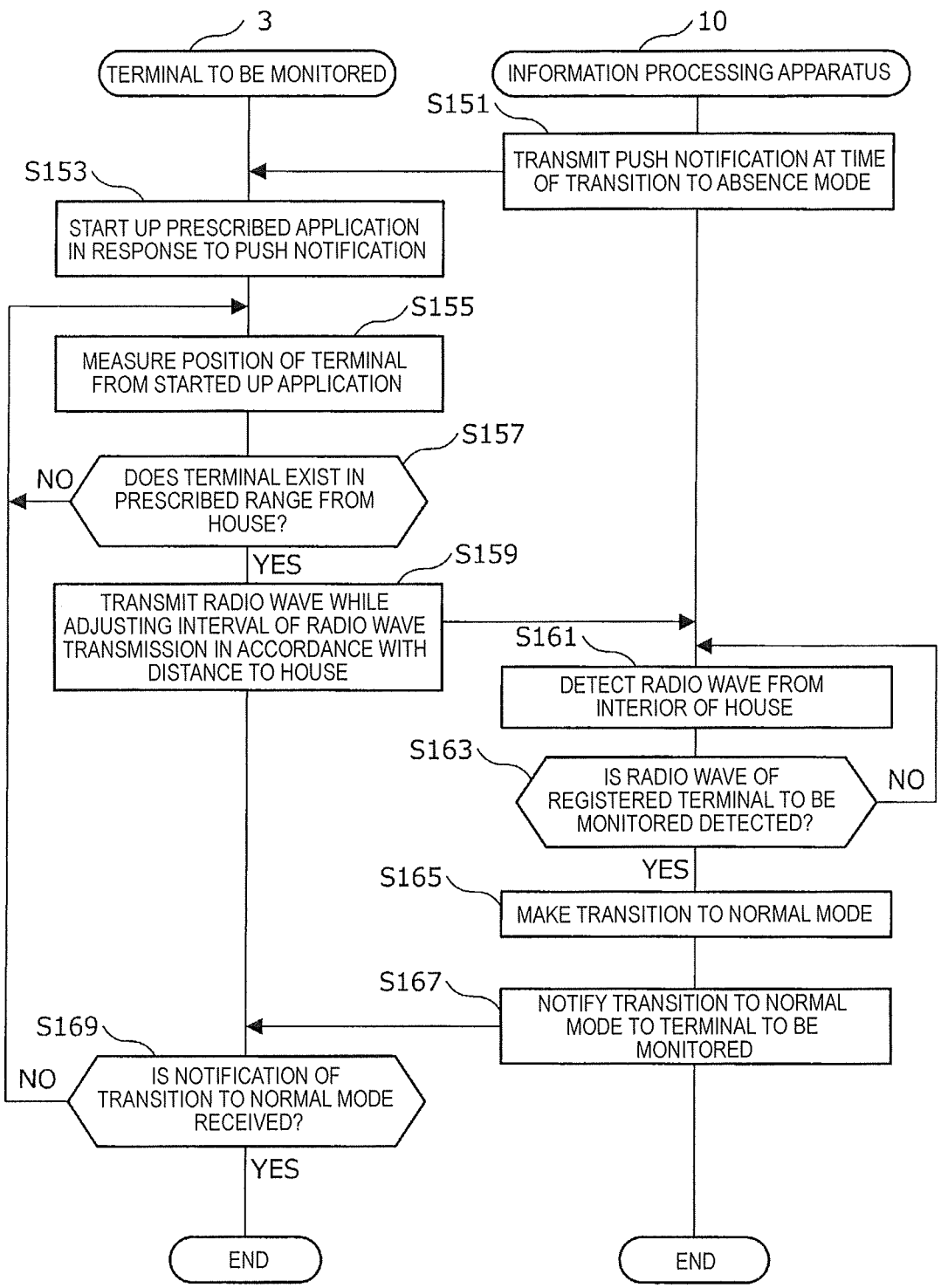
FIG. 9 is a flow chart showing an example of a flow of the information processing method according to the embodiment.

In the following, a flow of an information processing method according to the present embodiment is specifically described with reference to FIG. 8 and FIG. 9, using as an example the control of the operating state of the security system 21 among the house management systems 20. FIG. 8 and FIG. 9 are flow charts showing an example of the flow of an information processing method according to the present embodiment.

[Flow of Processing at Time of Transition to Absence Mode]

First, an example of the flow of processing when the security system 21 transitions to the absence mode is briefly described with reference to FIG. 8.

Note that it is assumed that, at the time of processing, radio wave information of home terminals 1 that can exist in the house is registered in the information processing apparatus 10 in advance (step S101). In this event, it is assumed that also which home terminal 1 among the registered home terminals 1 is the terminal to be monitored 3 is registered in advance.

The radio wave detection section 101 of the information processing apparatus 10 detects a radio wave emitted from the home terminal 1 as needed (step S103). On detecting a radio wave from the home terminal 1, the radio wave detection section 101 outputs radio wave information regarding the detected radio wave to the determination section 103.

On the basis of the radio wave information outputted from the radio wave detection section 101, the determination section 103 searches the home terminal DB registered in the storage section 109 (step S105), and determines whether the detected radio wave information is registered in the home terminal DB or not and determines, in a case where it is registered, whether it is radio wave information of the terminal to be monitored 3 or not. The determination section 103 outputs the obtained determination result to the control section 105.

The control section 105 determines whether all of the radio waves of the registered terminals to be monitored 3 are undetected or not (step S107). In a case where a radio wave of any of the terminals to be monitored 3 is detected, the control section 105 subsequently determines whether an absence sensing timer is set or not (step S109). In a case where the absence sensing timer is not set, the information processing apparatus 10 returns to step S103 and performs the detection of radio wave information. On the other hand, in a case where the absence sensing timer is set, the control section 105 resets the absence sensing timer to change the count of the timer back to the initial value (step S111). After that, the information processing apparatus 10 returns to step S103 and performs the detection of radio wave information.

On the other hand, in a case where in step S107 all of the radio waves of the registered terminals to be monitored 3 are undetected, the control section 105 determines whether the absence sensing timer is set or not (step S113). In a case where the absence sensing timer is not set, the control section 105 sets the absence sensing timer in accordance with the user's manipulation (step S115). After that, the information processing apparatus 10 returns to step S103 and performs the detection of radio wave information.

In a case where in step S113 it is determined that the absence sensing timer is set, the control section 105 determines whether the time set on the timer has elapsed or not (step S117). In a case where the time set on the timer has not elapsed, the information processing apparatus 10 returns to step S103 and performs the detection of radio wave information. On the other hand, in a case where the time set on the timer has elapsed, the control section 105 controls the operating state of the house management system 20 to transition the security system 21 from the normal mode to the absence mode (step S119). By such processing being performed, whether the occupant is at home or not is automatically distinguished, and the operating state of the management system of the house is controlled.

[Flow of Processing at Time of Cancellation of Absence Mode]

Next, an example of the flow of processing when the absence mode of the security system 21 is canceled and transitioned to the normal mode is briefly described with reference to FIG. 9.

Note that, before the following description, it is assumed that, when the control section 105 of the information processing apparatus 10 transitions the security system 21 to the absence mode, the control section 105 transmits a push notification to the terminal to be monitored 3 (step S151). In the terminal to be monitored 3 that has received a push notification, a prescribed application is started up in response to the push notification (step S153).

First, the terminal to be monitored 3 measures the position of the terminal from the started up application (step S155). The position measurement processing may use a satellite positioning system such as the GPS, or may use the homecoming sensing beacon 40 or the like. After that, the application started up in the terminal to be monitored 3 (more specifically, the control section of the terminal to be monitored 3 executing the application) determines whether the terminal exists in a prescribed range from the house or not (step S157).

In a case where the terminal to be monitored 3 does not exist in the prescribed range from the house, the terminal to be monitored 3 returns to step S155 and continues the processing. On the other hand, when the terminal to be monitored 3 is in the prescribed range with the house as the center, the application started up in the terminal to be monitored 3 transmits a radio wave while adjusting the interval of radio wave transmission in accordance with the distance to the house (step S159).

The radio wave detection section 101 of the information processing apparatus 10 detects a radio wave from the interior of the house as needed (step S161). The information processing apparatus 10 determines whether a radio wave of the registered terminal to be monitored 3 is detected or not (step S163). That is, the control section 105 of the information processing apparatus 10 determines whether a notification that a radio wave of the registered terminal to be monitored 3 is detected or not has been acquired from the determination section 103. Here, in a case where a radio wave of the registered terminal to be monitored 3 is not detected, the information processing apparatus 10 returns to step S161 and continues the processing. On the other hand, in a case where a radio wave of the registered terminal to be monitored 3 is detected, the control section 105 of the information processing apparatus 10 switches an operation at a higher security level in the security system 21 to the non-operating state and transitions the security system 21 from the absence mode to the normal mode (step S165). After that, the control section 105 of the information processing apparatus 10 notifies the terminal to be monitored 3 that the security system 21 has transitioned to the normal mode (step S167).

The application started up in the terminal to be monitored 3 awaits a notification that the security system 21 has transitioned to the normal mode. In a case where such a notification is not received, the application started up in the terminal to be monitored 3 returns to step S155 and continues the processing. On the other hand, in a case where such a notification is received, the application started up in the terminal to be monitored 3 finishes the processing.

By such processing being performed, in the information processing method according to the present embodiment, whether the occupant is at home or not is automatically distinguished, and it becomes possible to control the operating state of the management system of the house more simply.

(With Regard to Hardware Configuration)

Figure 10:
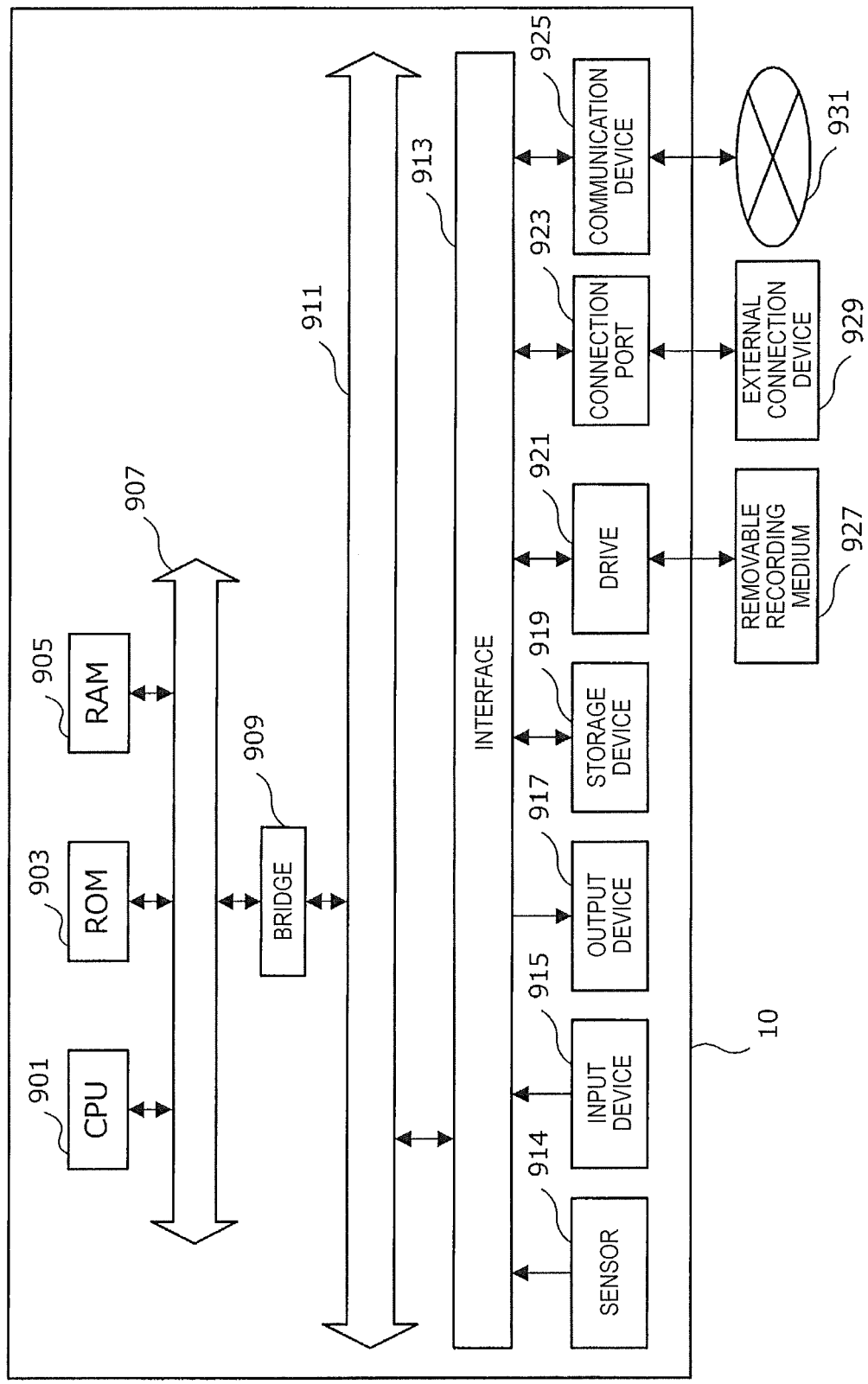
FIG. 10 is a block diagram showing an example of a hardware configuration of an information processing apparatus according to an embodiment of the present disclosure.

Next, the hardware configuration of the information processing apparatus 10 according to the embodiment of the present disclosure is described in detail with reference to FIG. 10. FIG. 10 is a block diagram for illustrating the hardware configuration of the information processing apparatus 10 according to the embodiment of the present disclosure.

The information processing apparatus 10 mainly include a CPU 901, a ROM 903, and a RAM 905. Furthermore, the information processing apparatus 10 also includes a host bus 907, a bridge 909, an external bus 911, an interface 913, a sensor 914, an input device 915, an output device 917, a storage device 919, a drive 921, a connection port 923, and a communication device 925.

The CPU 901 serves as an arithmetic processing apparatus and a control apparatus, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs by the CPU 901 and parameters and the like varying as appropriate during the execution of the programs. These are connected with each other via the host bus 907 including an internal bus such as a CPU bus.

The host bus 907 is connected to the external bus 911 such as a peripheral component interconnect/interface (PCI) bus via the bridge 909.

The sensor 914 is a means for detecting various radio waves, such as various radio wave sensors and antennas. Further, the sensor 914 may include, as well as those described above, detection means such as a sensor that senses the movement of the user or a sensor that acquires information showing the current position. As one example of such a sensor, a motion sensor such as a three-axis acceleration sensor including an acceleration sensor, a gravity detection sensor, a fall detection sensor, or the like, and a three-axis gyro sensor including an angular velocity sensor, a hand-blur compensation sensor, a geomagnetic sensor, or the like, a GPS sensor, or the like can be listed. Further, the sensor 914 may be equipped with various measurement apparatuses other than the above-described apparatuses, such as a thermometer, an illuminometer, a hygrometer, or the like.

The input device 915 is operation means operated by a user, such as a mouse, a keyboard, a touch panel, buttons, a switch and a lever. Also, the input device 915 may be remote control means (a so-called remote control) using, for example, infrared light or other radio waves, or may be an external connection device 929 such as a mobile phone or a PDA conforming to the operation of the information processing apparatus 10. Furthermore, the input device 915 generates an input signal on the basis of, for example, information which is inputted by a user with the above operation means, and includes an input control circuit or the like for outputting the input signal to the CPU 901. The user of the information processing apparatus 10 can input various data to the information processing apparatus 10 and can instruct the information processing apparatus 10 to perform processing by operating the input apparatus 915.

The output device 917 is includes a device capable of visually or audibly notifying acquired information to a user. Examples of such a device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processing performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data included as an example of a storage unit of the information processing apparatus 10 and is used to store data. The storage device 919 includes, for example, a magnetic storage device such as a hard disk drive (HDD), a semiconductor storage device, an optical storage device, or a magneto-optical storage device. The storage device 919 stores programs to be executed by the CPU 901, and externally obtained various data or the like.

The drive 921 is a reader/writer for a recording medium, and is embedded in the information processing apparatus 10 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write a record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (registered trademark) medium. The removable recording medium 927 may be a CompactFlash (CF, registered trademark), a flash memory, a secure digital (SD) memory card, or the like. Alternatively, the removable recording medium 927 may be, for example, an integrated circuit (IC) card equipped with a non-contact IC chip, an electronic appliance, or the like.

The connection port 923 is a port for allowing devices to directly connect to the information processing apparatus 10. Examples of the connection port 923 include a universal serial bus (USB) port, an IEEE1394 port, a small computer system interface (SCSI) port, and the like. Other examples of the connection port 923 include an RS-232C port, an optical audio terminal, a high-definition multimedia interface (HDMI, registered trademark) port, and the like. By connecting the external connection device 929 to the connection port 923, the information processing apparatus 10 directly acquires various data from the external connection device 929 and provides various data to the external connection device 929.

The communication device 925 is a communication interface including, for example, a communication device for establishing a connection to a communication network 931. The communication device 925 is, for example, a wired or wireless local area network (LAN), Bluetooth (registered trademark), a communication card for a wireless USB (WUSB), or the like. Alternatively, the communication device 925 may be a router for optical communication, a router for an asymmetric digital subscriber line (ADSL), a modem for various communications, or the like. The communication device 925 can transmit and receive signals and the like in accordance with a predetermined protocol such as TCP/IP or the like on the Internet and with other communication devices, for example. Further, the communication network 931 connected to the communication device 925 includes a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present disclosure has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a radio wave information learning section configured to record a plurality of pieces of radio wave information detected in a house and learn radio wave information of a plurality of terminals supposed to be in the house on a basis of the recorded radio wave information; and a control section configured to compare newly detected radio wave information and the radio wave information of the plurality of terminals supposed to be in the house based on a result of the learning, and perform processing for changing an operating state of a system that manages the house in a case where none of the plurality of terminals supposed to be in the house were detected for a prescribed time or more.

(2)

The information processing apparatus according to (1), in which the control section switches a security system of the house among systems that manage the house to an operating state in a case where none of pieces of radio wave information of the plurality of terminals supposed to be in the house were detected for a prescribed period.

(3)

The information processing apparatus according to (1) or (2), in which the control section outputs a control signal for turning off a power source of a prescribed electronic device to an energy management system of the house among systems that manage the house in a case where none of pieces of radio wave information of the plurality of terminals supposed to be in the house were detected for a prescribed period.

(4)

The information processing apparatus according to any one of (1) to (3), in which, in a case where the control section has acquired, from a system that manages the house, a notification that a doorway of the house is opened in a situation where the plurality of terminals supposed to be in the house are only one of an electronic device and a communication device carried by a user and the user does not carry a terminal supposed to be in the house, the control section warns the user that the user does not carry the terminal supposed to be in the house.

(5)

The information processing apparatus according to (4), in which the radio wave information learning section determines that the user does not carry the terminal supposed to be in the house in a case where, on a basis of at least one of position information of the terminal supposed to be in the house outputted from the terminal supposed to be in the house and attitude information of the terminal supposed to be in the house outputted from the terminal supposed to be in the house, it is determined that an existing position of the terminal supposed to be in the house is not changed.

(6)

The information processing apparatus according to any one of (1) to (5), in which the control section switches a security system of the house among systems that manage the house to a non-operating state in a case where the security system of the house is in an operating state and it is determined by the radio wave information learning section that an existing position of a terminal supposed to be in the house included in newly acquired radio wave information of the terminal supposed to be in the house is in a prescribed range from the house.

(7)

The information processing apparatus according to (6), in which the control section transmits a push notification to the terminal supposed to be in the house carried by the user when the control section puts into effect the security system of the house among the systems that manage the house, and a prescribed application started up in the terminal supposed to be in the house carried by the user on a basis of the push notification emits the radio wave information when the existing position of the terminal supposed to be in the house carried by the user is changed from a position outside a prescribed range from the house to a position inside the prescribed range from the house.

(8)

The information processing apparatus according to (7), in which the prescribed application emits the radio wave information on a basis of at least one of position measurement with a satellite positioning system and position measurement with a homecoming sensing beacon installed at the house.

(9)

The information processing apparatus according to (7) or (8), in which the prescribed application emits, in addition to the radio wave information, prescribed authentication information registered in advance, and the control section switches the security system of the house to the non-operating state in a case where the radio wave information is recorded and authentication of the authentication information is successful.

(10)

The information processing apparatus according to any one of (1) to (9), in which, after none of pieces of radio wave information of the plurality of terminals supposed to be in the house were detected for a prescribed period, the control section outputs, to a radio wave emitting device that emits a prescribed radio wave, a control signal for emitting toward an outside a false radio wave resembling a radio wave that the plurality of terminals supposed to be in the house emit.

(11)

The information processing apparatus according to any one of (1) to (10), in which the control section does not control the operating state of the system that manages the house in a case where the prescribed time for controlling the operating state of the system that manages the house is not set in advance.

(12)

The information processing apparatus according to any one of (1) to (11), in which the radio wave information learning section sets a terminal corresponding to the newly acquired radio wave information as a candidate for a terminal newly installed in the house in a case where the radio wave information is not recorded, and records the candidate for a terminal newly installed in the house as a terminal newly installed in the house in a case where the radio wave information corresponding to the candidate for a terminal newly installed in the house has been detected a prescribed number of times or more within a prescribed period.

(13)

The information processing apparatus according to any one of (1) to (12), in which the radio wave information is radio wave information of a radio wave used for wireless communication.

(14)

The information processing apparatus according to any one of (1) to (13), further including a radio wave detection section configured to acquire the radio wave information.

(15)

An information processing method including:

recording a plurality of pieces of radio wave information detected in a house and learning radio wave information of a plurality of terminals supposed to be in the house on a basis of the recorded radio wave information; and comparing newly detected radio wave information and the radio wave information of the plurality of terminals supposed to be in the house based on a result of the learning, and performing processing for changing an operating state of a system that manages the house in a case where none of the plurality of terminals supposed to be in the house were detected for a prescribed time or more.

(16)

A program for causing a computer to execute the processing of:

a radio wave information learning function of recording a plurality of pieces of radio wave information detected in a house and learning radio wave information of a plurality of terminals supposed to be in the house on a basis of the recorded radio wave information; and a control function of comparing newly detected radio wave information and the radio wave information of the plurality of terminals supposed to be in the house based on a result of the learning, and performing processing for changing an operating state of a system that manages the house in a case where none of the plurality of terminals supposed to be in the house were detected for a prescribed time or more.

REFERENCE SIGNS LIST 1 home terminal
3 terminal to be monitored
5 terminal to be unmonitored
10 information processing apparatus
20 house management system
21 security system
23 energy management system
101 radio wave detection section
103 determination section
105 control section
107 communication section
109 storage section
121 radio wave information searching section
123 home terminal registration section
125 terminal-to-be-monitored carrying state assessment section
131 system operating state control section
133 terminal cooperation section
135 not-carrying warning section
137 false radio wave generation control section

The invention claimed is:

1. An information processing apparatus, comprising: processing circuitry configured to record a plurality of pieces of radio wave information detected in a house and learn radio wave information of a plurality of terminals supposed to be in the house on a basis of the recorded radio wave information;

store, in a memory, each feature value that features each radio wave information of each of the plurality of terminals supposed to be in the house based on learning of each electric field intensity of each of the plurality of terminals supposed to be in the house, the feature value including electric field intensity information;

compare electric field intensity of newly detected radio wave information and each of the feature value stored in the memory;

determine, based on the comparing, whether the newly detected radio wave information corresponds to at least one of the plurality of pieces of the radio wave information of the plurality of terminals supposed to be in the house; and control a system that manages the house to change an operating state to manage the house from a normal mode to an absence mode in response to determining that the newly detected radio wave information corresponds to none of the plurality of pieces of the radio wave information of the plurality of terminals supposed to be in the house for a prescribed time or more, wherein the processing circuitry is further configured to:

output a control signal for turning off a power source of a prescribed electronic device to an energy management system of the house among systems that manage the house in response to determining that the newly detected radio wave information corresponds to none of the plurality of pieces of the radio wave information of the plurality of terminals supposed to be in the house for a prescribed time or more;

transmit a push notification to the at least one of the plurality of terminals supposed to be in the house in response to the operation state being changed from the normal mode to the absence mode, the push notification starting up, in the least one of the plurality of terminals supposed to be in the house, a prescribed application, wherein the prescribed application measures a position of the at least one of the plurality of terminals supposed to be in the house, determines whether the at least one of the plurality of terminals supposed to be in the house is located within a predetermined range from the house, and controls the at least one of the plurality of terminals supposed to be in the house to emit the radio wave information in response to determining that the at least one of the plurality of terminals supposed to be in the house is located within the predetermined range from the house; and control the system that manages the house to change the operating state to manage the house from the absence mode to the normal mode in response to detecting the radio wave information emitted, under the prescribed application, by the at least one of the plurality of terminals supposed to be in the house.

2. The information processing apparatus according to claim 1, wherein the processing circuitry switches a security system of the house among systems that manage the house to the absence mode in response to determining that the newly detected radio wave information corresponds to none of the plurality of pieces of the radio wave information of the plurality of terminals supposed to be in the house for the prescribed time or more.

3. The information processing apparatus according to claim 1, wherein, in a case where the processing circuitry has acquired, from the system that manages the house, a notification that a doorway of the house is opened in a situation where the plurality of terminals supposed to be in the house are only one of an electronic device and a communication device carried by a user and the user does not carry a terminal supposed to be in the house, the processing circuitry warns the user that the user does not carry the terminal supposed to be in the house.

4. The information processing apparatus according to claim 3,
wherein the processing circuitry determines that the user does not carry the terminal supposed to be in the house in a case where, on a basis of at least one of position information of the terminal supposed to be in the house outputted from the terminal supposed to be in the house and attitude information of the terminal supposed to be in the house outputted from the terminal supposed to be in the house, it is determined that an existing position of the terminal supposed to be in the house is not changed.

5. The information processing apparatus according to claim 1,
wherein the prescribed application emits the radio wave information on a basis of at least one of position measurement with a satellite positioning system and position measurement with a homecoming sensing beacon installed at the house.

6. The information processing apparatus according to claim 1,
wherein the prescribed application emits, in addition to the radio wave information, prescribed authentication information registered in advance, and
the processing circuitry switches the security system of the house to the normal mode in a case where the radio wave information is recorded and authentication of the authentication information is successful.

7. The information processing apparatus according to claim 1,
wherein, after none of pieces of radio wave information of the plurality of terminals supposed to be in the house were detected for a prescribed period, the processing circuitry outputs, to a radio wave emitting device that emits a prescribed radio wave, a control signal for emitting toward an outside a false radio wave resembling a radio wave that the plurality of terminals supposed to be in the house emit.

8. The information processing apparatus according to claim 1,
wherein the processing circuitry does not control the operating state of the system that manages the house in a case where the prescribed time for controlling the operating state of the system that manages the house is not set in advance.

9. The information processing apparatus according to claim 1,
wherein the processing circuitry sets a terminal corresponding to the newly acquired radio wave information as a candidate for a terminal newly installed in the house in a case where the radio wave information is not recorded, and
records the candidate for a terminal newly installed in the house as a terminal newly installed in the house in a case where the radio wave information corresponding to the candidate for a terminal newly installed in the house has been detected a prescribed number of times or more within a prescribed period.

10. The information processing apparatus according to claim 1,
wherein the radio wave information is radio wave information of a radio wave used for wireless communication.

11. The information processing apparatus according to claim 1,
further comprising a radio wave detection section configured to acquire the radio wave information.

12. An information processing method, comprising:
recording a plurality of pieces of radio wave information detected in a house and learning radio wave information of a plurality of terminals supposed to be in the house on a basis of the recorded radio wave information;
storing, in a memory, each feature value that features each radio wave information of each of the plurality of terminals supposed to be in the house based on learning f each electric field intensity of each of the plurality of terminals supposed to be in the house, the feature value including electric field intensity information;
comparing, using processing circuitry, electric field intensity of newly detected radio wave information and each of the feature value stored in the memory;
determining, based on the comparing, whether the newly detected radio wave information corresponds to at least one of the plurality of pieces of the radio wave information of the plurality of terminals supposed to be in the house; and
controlling a system that manages the house to change an operating state to manage the house from a normal mode to an absence mode in response to determining that the newly detected radio wave information corresponds to none of the plurality of pieces of the radio wave information of the plurality of terminals supposed to be in the house for a prescribed time or more, wherein
the method further comprises:
outputting a control signal for turning off a power source of a prescribed electronic device to an energy management system of the house among systems that manage the house in response to determining that the newly detected radio wave information corresponds to none of the plurality of pieces of the radio wave information of the plurality of terminals supposed to be in the house for a prescribed time or more;
transmitting a push notification to the at least one of the plurality of terminals supposed to be in the house in response to the operation state being changed from the normal mode to the absence mode, the push notification starting up, in the least one of the plurality of terminals supposed to be in the house a prescribed application, wherein the prescribed application measures a position of the at least one of the plurality of terminals supposed to be in the house, determines whether the at least one of the plurality of terminals supposed to be in the house is located within a predetermined range from the house, and controls the at least one of the plurality of terminals supposed to be in the house to emit the radio wave information in response to determining that the at least one of the plurality of terminals supposed to be in the house is located within the predetermined range from the house; and
controlling the system that manages the house to change the operating state to manage the house from the absence mode to the normal mode in response to detecting the radio wave information emitted, under the prescribed application, by the at least one of the plurality of terminals supposed to be in the house.

13. A non-transitory computer readable medium including executable instructions, which when executed by a computer cause the computer to execute an information processing method, the method comprising:

recording a plurality of pieces of radio wave information detected in a house and learning radio wave information of a plurality of terminals supposed to be in the house on a basis of the recorded radio wave information;

storing, in a memory, each feature value that features each radio wave information of each of the plurality of terminals supposed to be in the house based on learning of each electric field intensity of each of the plurality of terminals supposed to be in the house, ire feature value including electric field intensity information;

comparing electric field intensity of newly detected radio wave information and each of the feature value stored in the memory;

determining, based on the comparing, whether the newly detected radio wave information corresponds to at least one of the plurality of pieces of the radio wave information of the plurality of terminals supposed to be in the house; and controlling a system that manages the house to change an operating state to manage the house from a normal mode to an absence mode in response to determining that the newly detected radio wave information corresponds to none of the plurality of pieces of the radio wave information of the plurality of terminals supposed to be in the house for a prescribed time or more, wherein the method further comprises:

outputting a control signal for turning off a power source of a prescribed electronic device to an energy management system of the house among systems that manage the house in response to determining that the newly detected radio wave information corresponds to none of the plurality of pieces of the radio wave information of the plurality of terminals supposed to be in the house for a prescribed time or more;

transmitting a push notification to the at least one of the plurality of terminals supposed to be in the house in response to the operation state being changed from the normal mode to the absence mode, the push notification starting up, in the least one of the plurality of terminals supposed to be in the house, a prescribed application, wherein the prescribed application measures a position of the at least one of the plurality of terminals supposed to be in the house, determines whether the at least one of the plurality of terminals supposed to be in the house is located within a predetermined range from the house, and controls the at least one of the plurality of terminals supposed to be in the house to emit the radio wave information in response to determining, that the at least one of the plurality of terminals supposed to be in the house is located within the predetermined range from the house; and controlling the system that manages the house to change the operating state to manage the house from the absence mode to the normal mode in response to detecting the radio wave information emitted, under the prescribed application, by the at least one of the plurality of terminals supposed to be in the house.

14. The information processing apparatus according to claim 1,
wherein the feature value further includes at least one of ID information, MAC address information, and timestamp information regarding when the radio wave information is received.

15. The information processing apparatus according to claim 1,
wherein the feature value further includes timestamp information regarding when the radio wave information is received.

* * * * *